United States Patent
Fascenda

(10) Patent No.: US 7,934,005 B2
(45) Date of Patent: Apr. 26, 2011

(54) SUBNET BOX

(75) Inventor: Anthony C. Fascenda, North Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 873 days.

(21) Appl. No.: 10/935,123

(22) Filed: Sep. 8, 2004

(65) Prior Publication Data

US 2005/0091483 A1    Apr. 28, 2005

Related U.S. Application Data

(63) Continuation-in-part of application No. 10/679,371, filed on Oct. 7, 2003, now Pat. No. 7,325,134.

(60) Provisional application No. 60/500,651, filed on Sep. 8, 2003.

(51) Int. Cl.
*G06F 15/16* (2006.01)

(52) U.S. Cl. ............. 709/229; 380/270; 726/20; 726/29

(58) Field of Classification Search .......... 709/220–229, 709/201–203, 243, 249–250, 200; 370/338, 370/389, 392, 395.3, 395.52; 455/414.1; 713/153–159, 169–175; 726/20, 23, 29
See application file for complete search history.

(56) References Cited

U.S. PATENT DOCUMENTS

| | | | |
|---|---|---|---|
| 5,768,382 A | 6/1998 | Schneier et al. | |
| 6,304,658 B1 | 10/2001 | Kocher et al. | |
| 6,397,328 B1 | 5/2002 | Pitchenik et al. | |
| 6,526,264 B2 | 2/2003 | Sugar et al. | |
| 6,571,221 B1 | 5/2003 | Stewart et al. | |
| 6,611,821 B2 | 8/2003 | Stahl et al. | |
| 6,643,781 B1 | 11/2003 | Merriam | |
| 6,657,981 B1 | 12/2003 | Lee et al. | |
| 7,073,066 B1 * | 7/2006 | Nessett | 713/181 |
| 7,248,858 B2 * | 7/2007 | Barber et al. | 455/414.1 |
| 7,277,547 B1 * | 10/2007 | Delker et al. | 380/270 |
| 7,283,525 B2 * | 10/2007 | Burgess et al. | 370/392 |
| 7,289,631 B2 * | 10/2007 | Ishidoshiro | 380/270 |
| 2001/0048744 A1 | 12/2001 | Kimura | |
| 2001/0054147 A1 | 12/2001 | Richards | |
| 2002/0021665 A1 | 2/2002 | Bhagavath et al. | |
| 2002/0129143 A1 | 9/2002 | McKinnon, III et al. | |
| 2002/0147819 A1 * | 10/2002 | Miyakoshi et al. | 709/228 |
| 2002/0157090 A1 | 10/2002 | Anton, Jr. | |
| 2002/0169712 A1 | 11/2002 | Ginzboorg et al. | |
| 2003/0041244 A1 | 2/2003 | Buttyan et al. | |
| 2003/0051132 A1 * | 3/2003 | Kobayashi et al. | 713/153 |
| 2003/0051140 A1 | 3/2003 | Buddhikot et al. | |
| 2003/0070067 A1 | 4/2003 | Saito | |

(Continued)

*Primary Examiner* — Yemane Mesfin
*Assistant Examiner* — Greg Bengzon
(74) *Attorney, Agent, or Firm* — Hunton & Williams LLP

(57) ABSTRACT

The invention provides an external in-line device ("Subnet Box") placed between a network and an access point to achieve secure Wi-Fi communications without needing to modify the access point. The Subnet Box comprises an embedded token and will authenticate users based on pre-stored access rights. In at least one embodiment of the invention, the Subnet Box comprises: a first communications port for intercepting data packets communicated to and from a wired communications network; a second communications port for intercepting data packets communicated to and from a wireless access point, wherein the wireless access point is an edge device of the wired communications network; a database comprising a number of serial numbers each associated with a client token and a secret cryptographic key; and a processor for determining whether a computing device having a client token can access the wired communications network via the wireless access point. The processor establishes a secure tunnel between the computing device and the first communications port.

17 Claims, 13 Drawing Sheets

Subnet Box Flowchart, Packet Type

U.S. PATENT DOCUMENTS

| | | |
|---|---|---|
| 2003/0093680 A1 | 5/2003 | Astley et al. |
| 2004/0003059 A1* | 1/2004 | Kitchin .................. 709/220 |
| 2004/0023639 A1 | 2/2004 | Noel, Jr. |
| 2004/0100973 A1* | 5/2004 | Prasad .................. 370/401 |
| 2004/0148374 A1* | 7/2004 | Bush et al. ............. 709/223 |
| 2004/0196977 A1* | 10/2004 | Johnson et al. ......... 380/270 |
| 2004/0203590 A1 | 10/2004 | Shteyn |
| 2004/0208151 A1* | 10/2004 | Haverinen et al. ...... 370/338 |
| 2005/0010680 A1 | 1/2005 | Zick et al. |
| 2005/0152305 A1* | 7/2005 | Ji et al. ................. 370/328 |

* cited by examiner

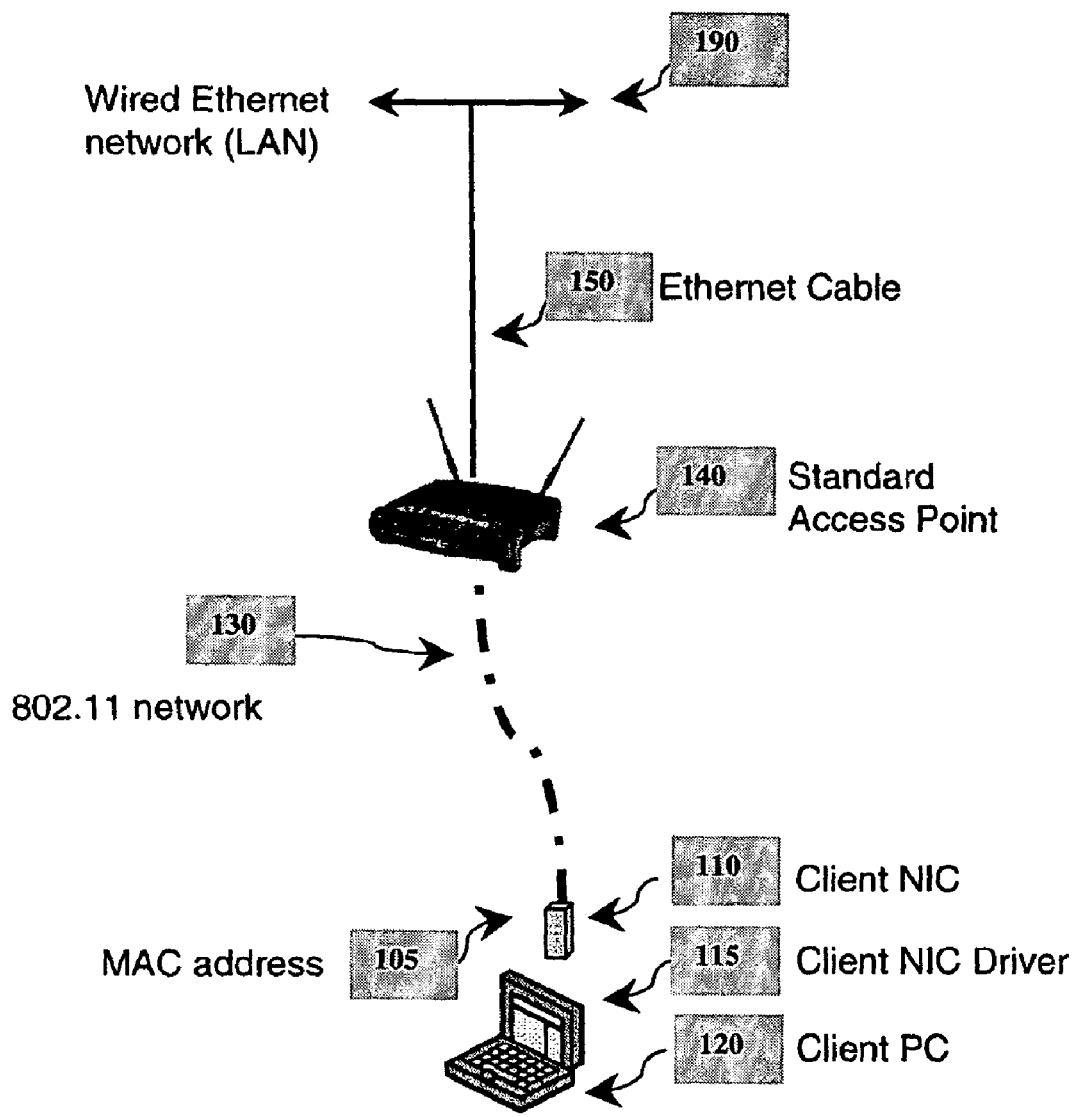

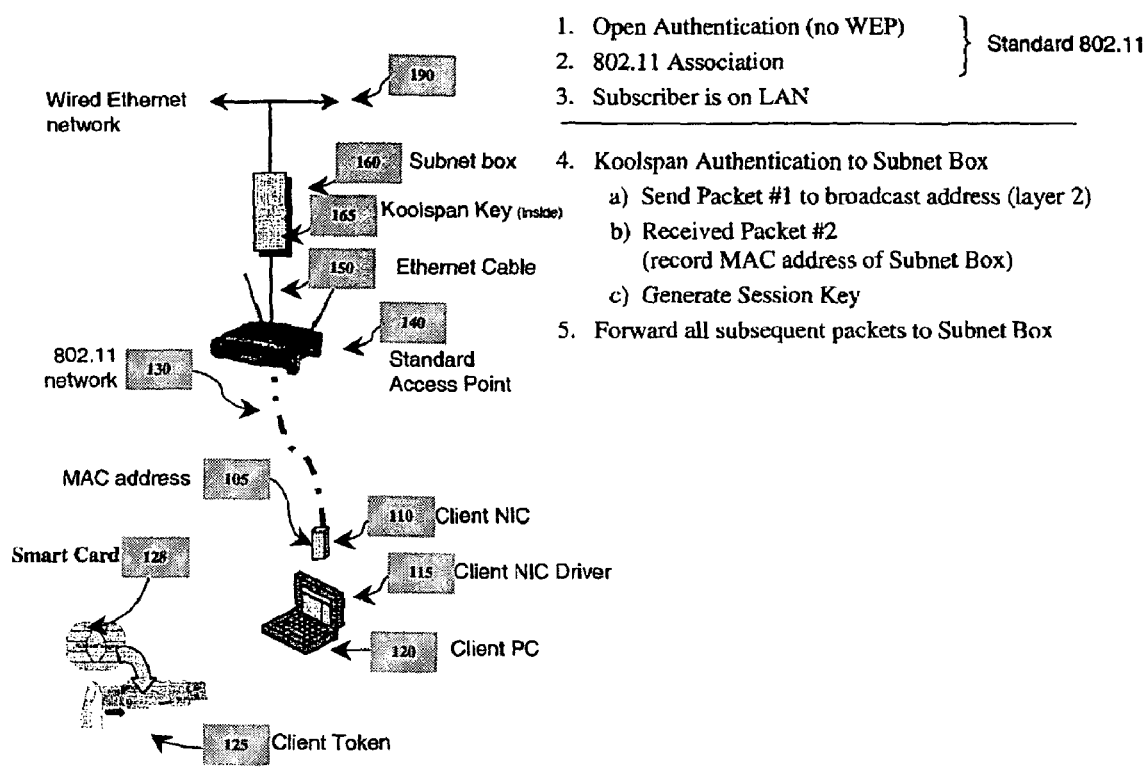
Figure 2: Network Diagram: Subnet Box

Figure 3: Subnet Box Functionality
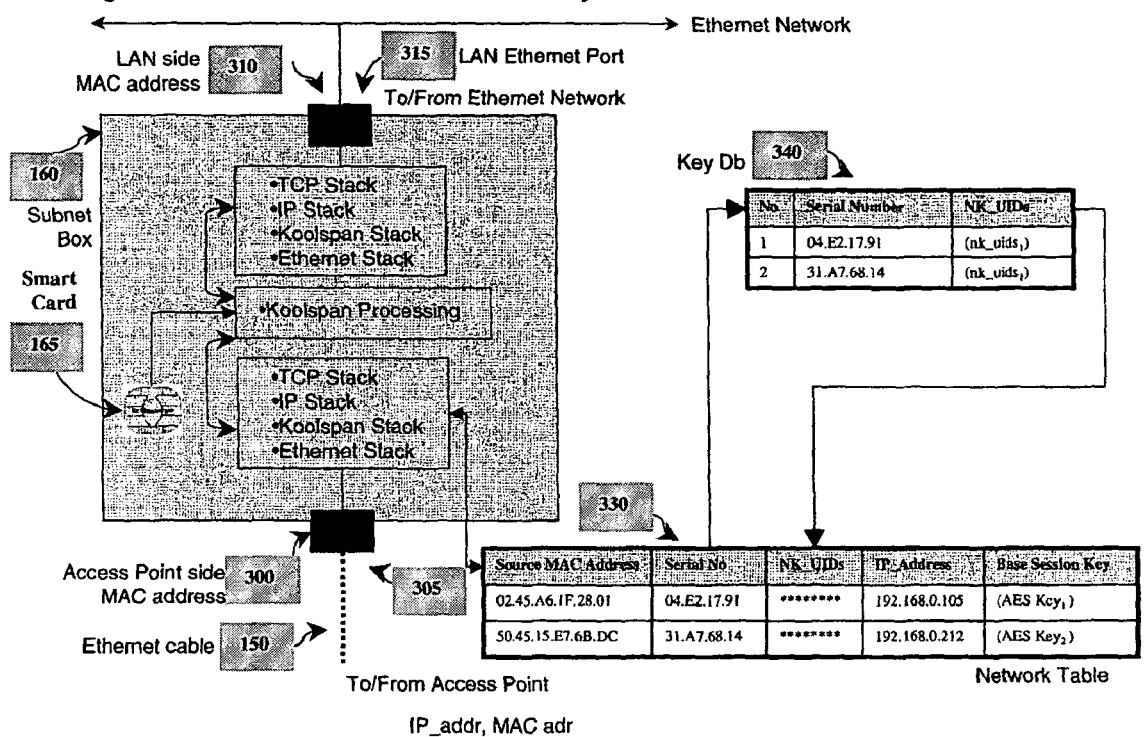

Figure 4: Encapsulation: Protocol Stack
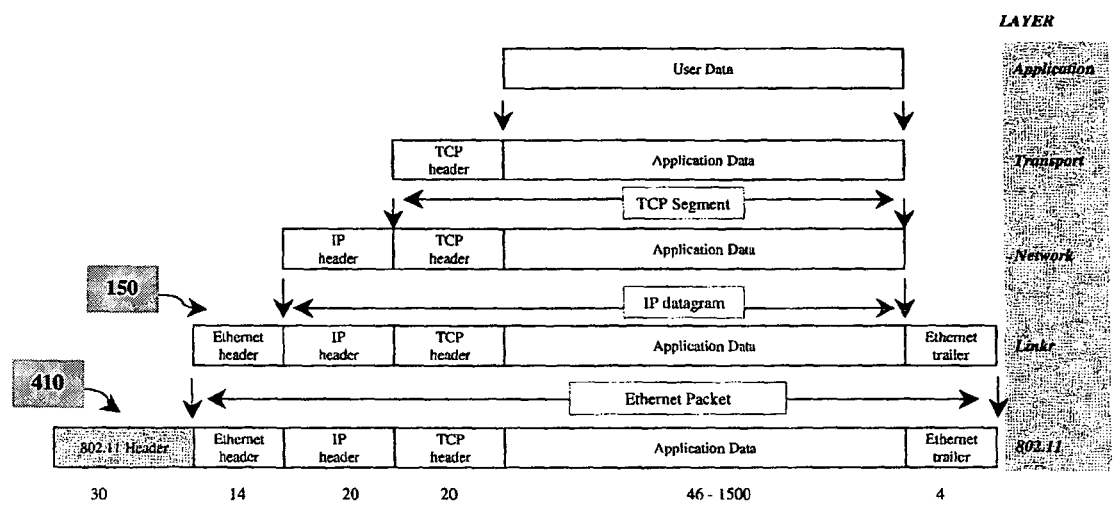

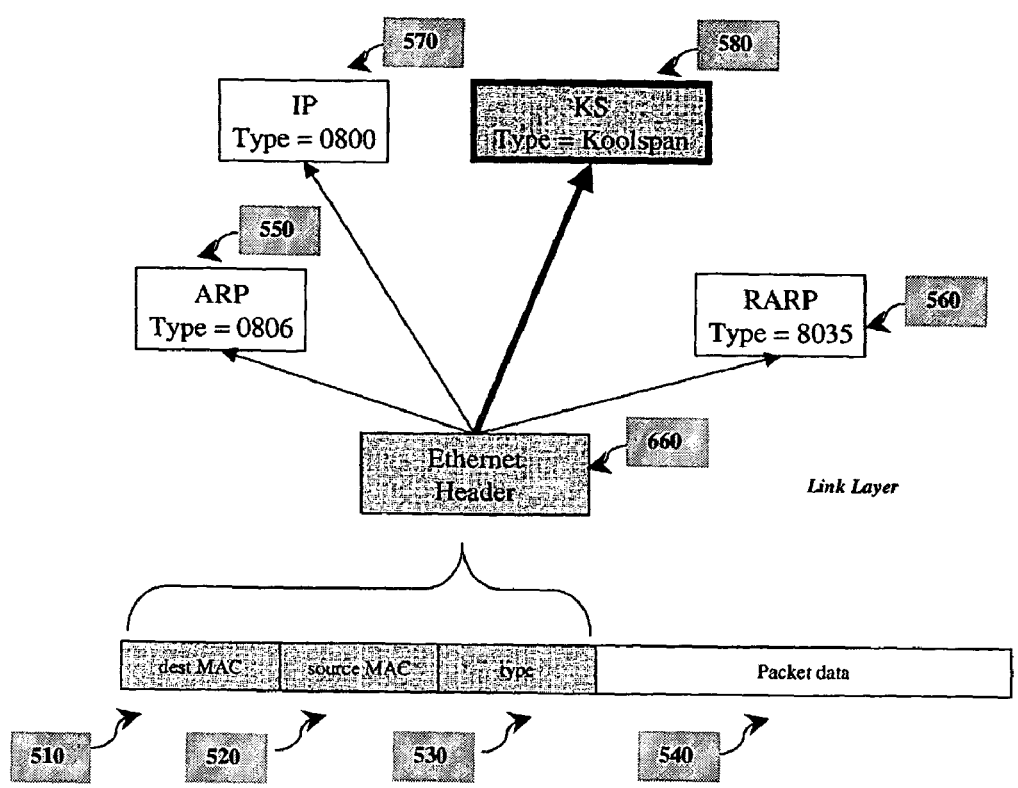
Figure 5: Packet Types

Figure 6: Client Driver
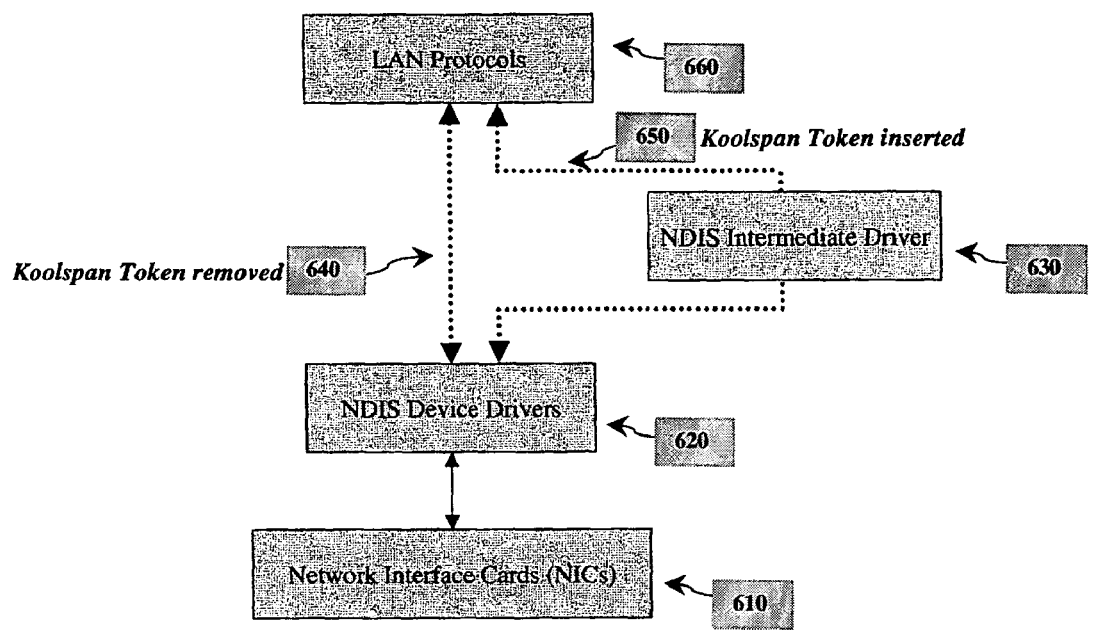

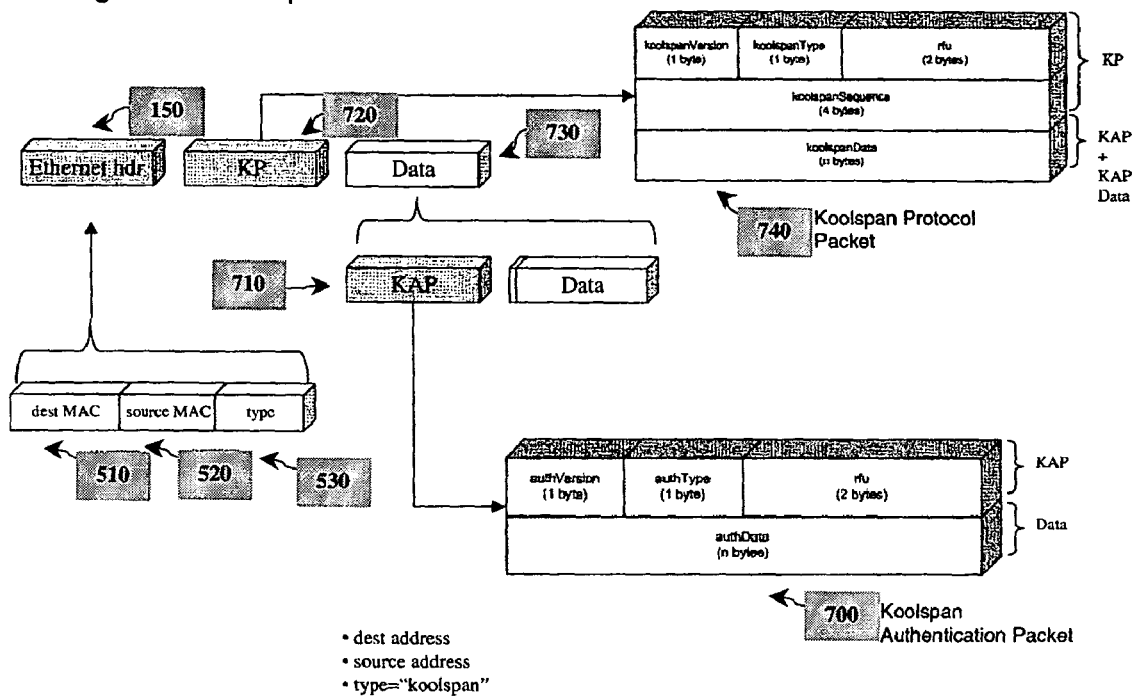
Figure 7: Koolspan Client Packets

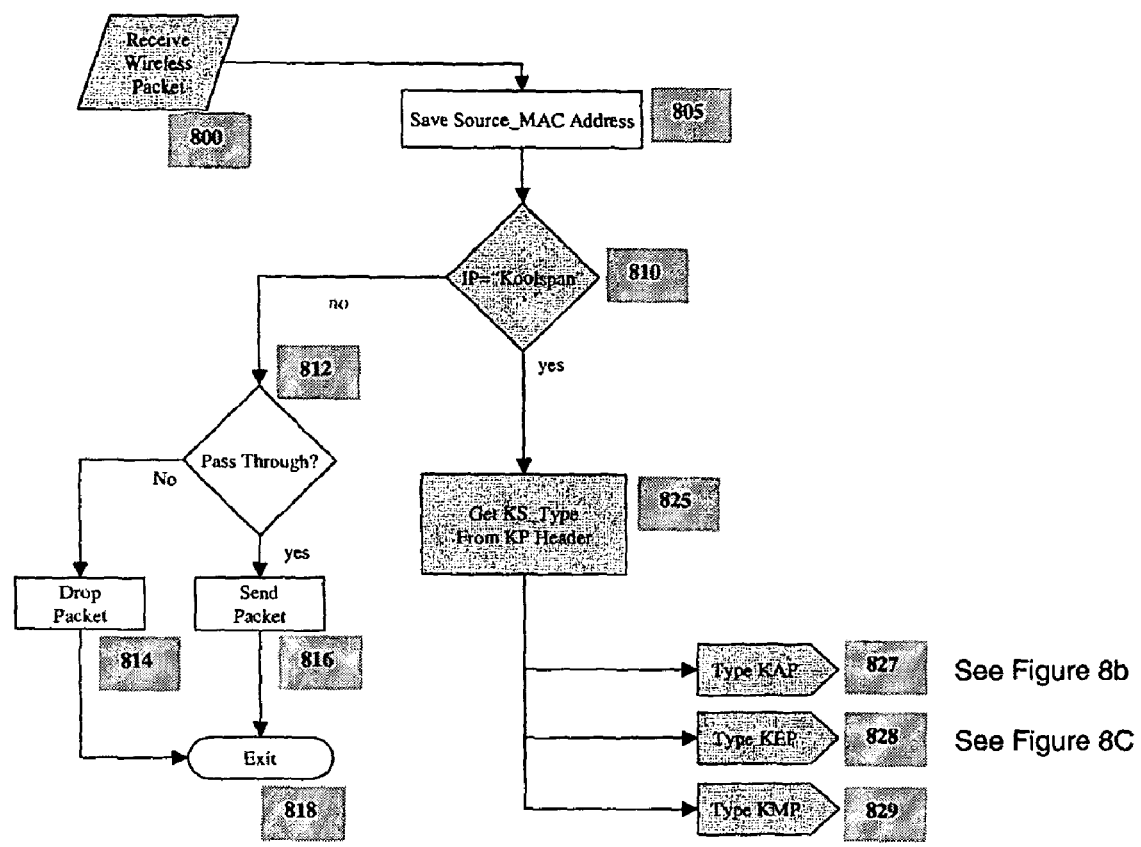
Figure 8a: Subnet Box Flowchart, Packet Type

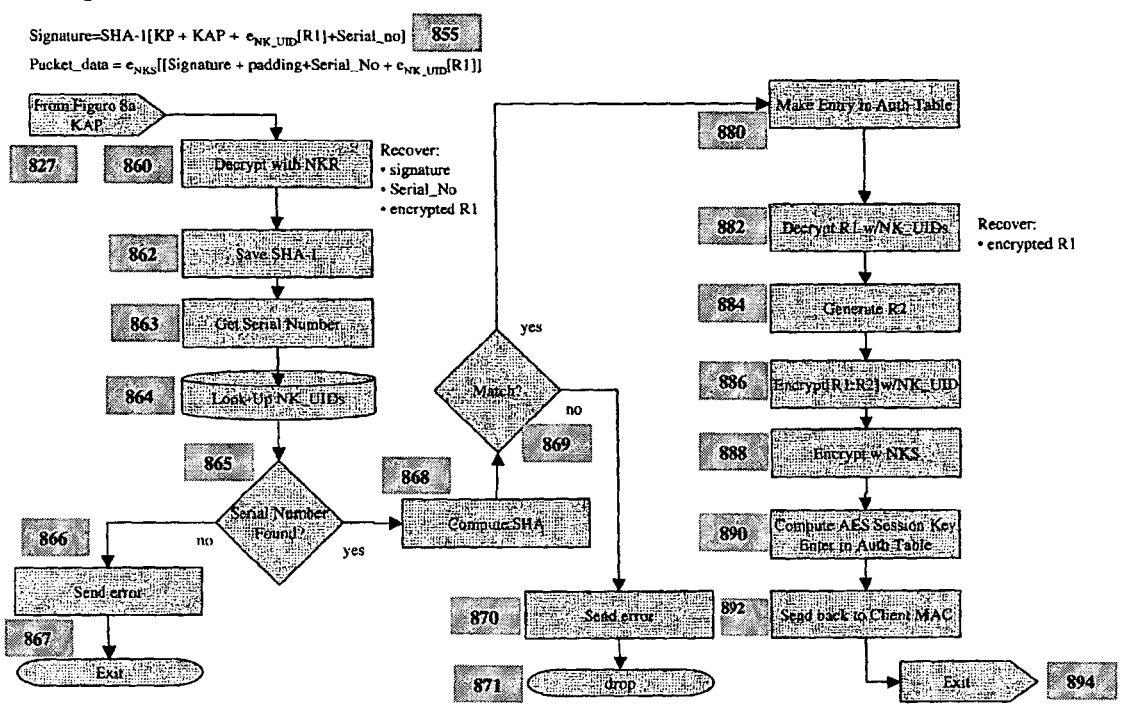
Figure 8b: Subnet Box Flowchart, Authentication

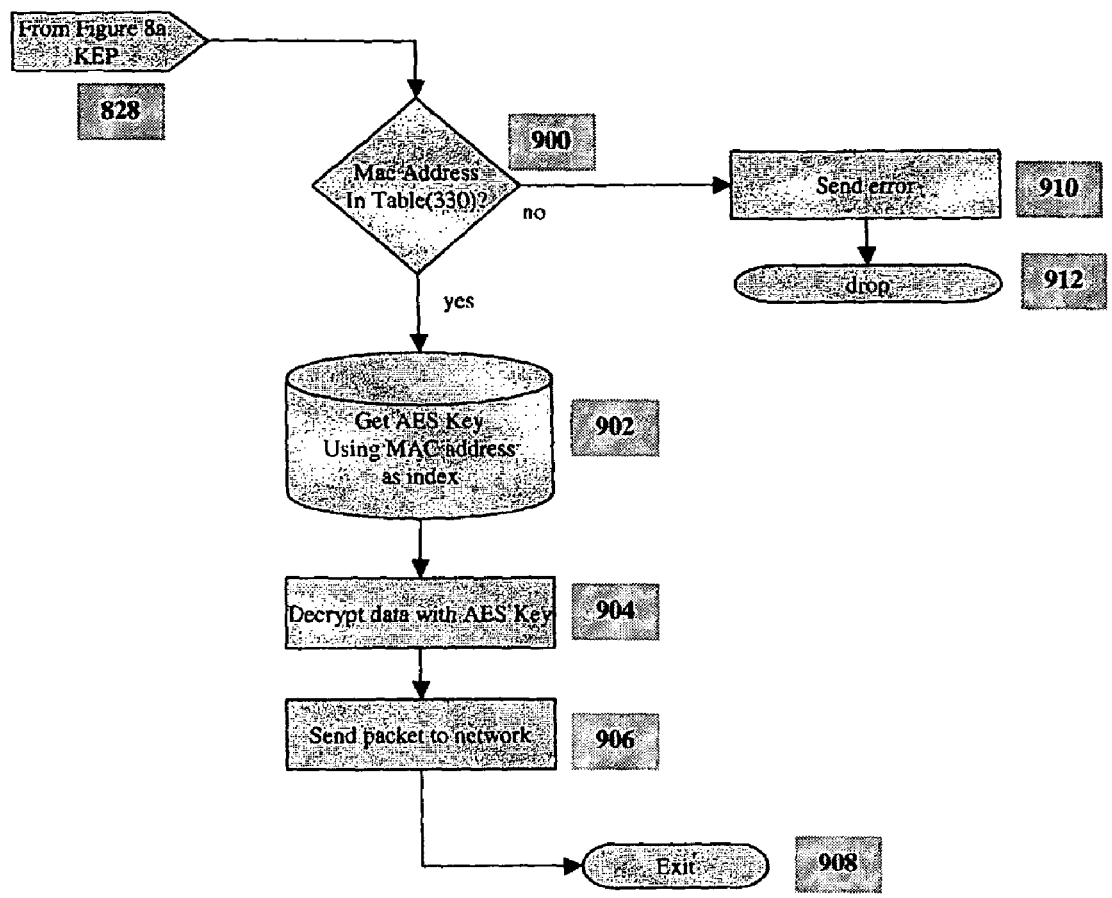

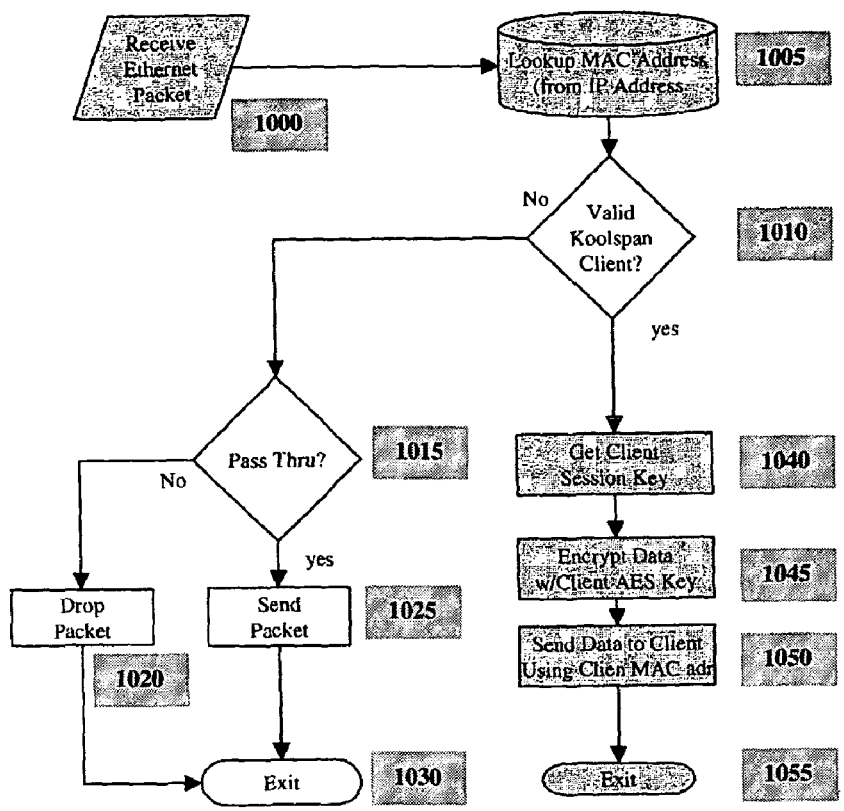
Figure 9: Subnet Box Flowchart; Network Received Pkt

Figure 10: CLIENT NDIS Intermediate Driver Authentication
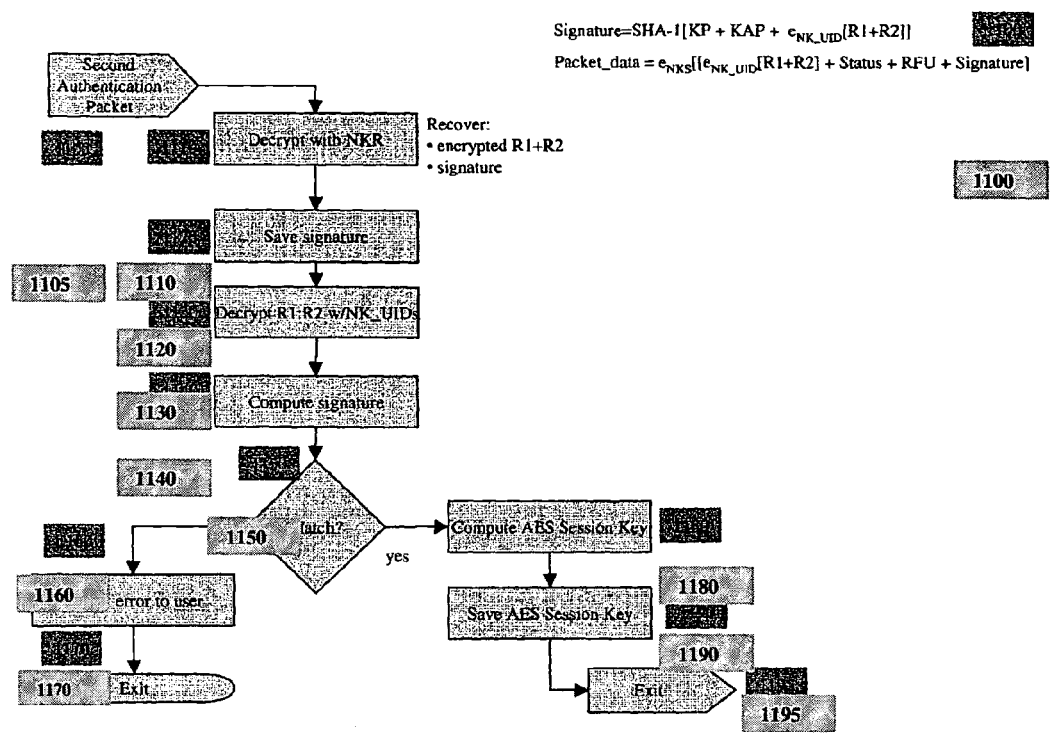

Figure 11: Subnet Box Block diagram
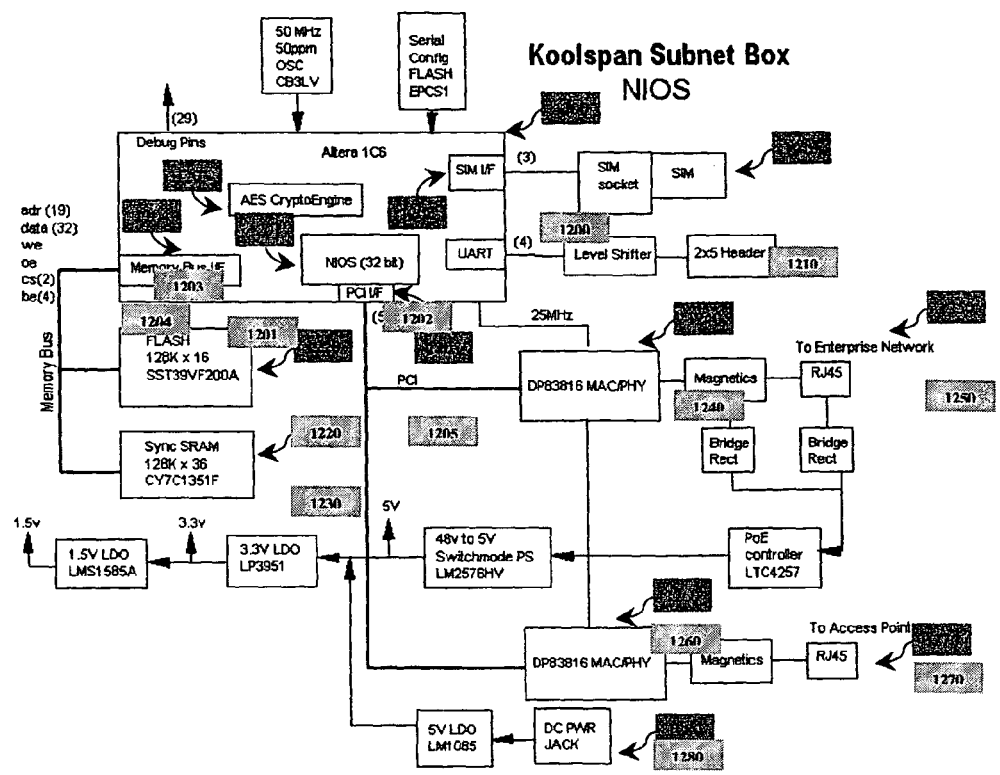

SUBNET BOX

CROSS-REFERENCE TO RELATED APPLICATIONS

The instant application claims priority to U.S. Provisional Application No. 60/600,651 filed Sep. 8, 2003, the disclosure of which is incorporated herein by reference in its entirety. The instant application is a continuation-in-part of U.S. patent application Ser. No. 10/679,371, entitled "Localized Network Authentication and Security Using Tamper-Resistant Keys," filed Oct. 7, 2003, the disclosure of which is incorporated herein by reference in its entirety. The instant application is also related to U.S. patent application Ser. No. 10/679,268, entitled "Shared Network Access Using Different Access Keys," filed Oct. 7, 2003, and U.S. patent application Ser. No. 10/679,472, entitled "Self-Managed Network Access Using Localized Access Management," filed Oct. 7, 2003, the disclosures of which are both incorporated by reference in their entirety.

BACKGROUND OF THE INVENTION

1. Field of the Invention

The present invention relates to wireless networking, and more particularly, to an authentication and secure communication technique for Wi-Fi (IEEE 802.11) networks.

2. Description of Related Art

A Wireless Local Area Network (WLAN) is generally implemented to provide local connectivity between a wired network and a mobile computing device. In a typical wireless network, all of the computing devices within the network broadcast their information to one another using radio frequency (RF) communications. WLANs are based on the Institute of Electrical and Electronic Engineers (IEEE) 802.11 standard, which designates a wireless-Ethernet specification using a variety of modulation techniques at frequencies generally in the 2.4 gigahertz (GHz) and 5 GHz license-free frequency bands.

The IEEE 802.11 standard ("Wi-Fi") enables wireless communications with throughput rates up to 54 Mbps. Wi-Fi (for "wireless fidelity") is essentially a seal of approval certifying that a manufacturer's product is compliant with IEEE 802.11. For example, equipment carrying the "Wi-Fi" logo is certified to be interoperable with other Wi-Fi certified equipment. There are Wi-Fi compatible PC cards that operate in peer-to-peer mode, but Wi-Fi usually incorporates at least one access point, or edge device. Most access points have an integrated Ethernet controller to connect to an existing wired-Ethernet network. A Wi-Fi wireless transceiver connects users via the access point to the rest of the LAN. The majority of Wi-Fi wireless transceivers available are in Personal Computer Memory Card International Association (PCMCIA) card form, particularly for laptop, palmtop, and other portable computers, however Wi-Fi transceivers can be implemented through an Industry Standard Architecture (ISA) slot or Peripheral Component Interconnect (PCI) slot in a desktop computer, a Universal Serial Bus (USB), or can be fully integrated within a handheld device.

When network packets are formed, they typically result from a process known as encapsulation. FIG. 4 shows the "layered" sequence of packet formation well known as the "protocol suite." See Richard Stevens, TCP/IP Illustrated, Vol. 1 (Addison-Wesley ISBN 0-201-63346-9). All network packets are typically identified by an Ethernet Header (150). The addition of 802.11 wireless functionality adds yet another layer below the link layer and is known as the 802.11 layer and this layer adds an additional 802.11 header (410). The Client Network Interface Card (NIC) (110) adds the 802.11 header (410) to the Ethernet packet and is used to transport the Ethernet packet across the wireless medium On receipt of an 802.11 packet from an authenticated and associated Client NIC (110), the Access Point (140) will remove the 802.11 header (410) and place the remaining packet on the Ethernet cable (150). The Ethernet packet stripped of its 802.11 header is placed on the LAN as if the Client PC were directly connected on the LAN instead of being bridged by the combination of Client NIC (110) and Access Point (140). This process of stripping headers is known as "de-multiplexing". As seen in FIG. 1, the 802.11 network (WLAN, 130) comprises at least one Access Point (140) attached via Ethernet cable (150) to the wired network (LAN, 190). The Access Point (140) provides a wireless bridge for connecting clients PCs (120) to the LAN, 190. The process of connection when security is not invoked is for the client NIC (110) to perform an Open Authentication to the Access Point (140). As the authentication is "open", any Client will be automatically authenticated. The Access Point (140) grants permission to the Client NIC (110) to "associate" to the Access Point (140). The Client NIC (110) then "associates" to the Access Point (140) and the Client's PC (120) is now "bridged" to the LAN (190).

The process of bridging involves the Access Point (140) to manage the wireless traffic and remove the 802.11 header (410) placing the packet on the Ethernet cable as if the Client PC (110) were "hard-wired" to the network. In the case of Wired Equivalent Privacy (WEP) security, the process is identical except that the 802.11 authentication type is changed from "open" to "WEP' and the predefined WEP parameters are used by the NIC (110) to encrypt communications from the Client PC (120) to the Access Point (140). The Access Point (140) decrypts all packets coming from the Client PC (120) using the pre-defined WEP parameters. Turning on WEP encryption prevents and Client NIC (110) not using the exact WEP parameters from connecting to the Access Point (140) and gaining access to the network (190). The WEP parameters thus are employed both for authentication and encryption purposes.

The Access Point (140) maintains the relationship between itself and the Client NIC (110) by means of the Client's MAC address (105). The Client's MAC address is the mechanism by which a Client's connection is managed by the Access Point (140). The Access Point (140) typically employs WEP security, a software algorithm that is used both for authentication purposes and to provide wireless link security. If WEP is turned on in the Access Point (140), no other users can connect to the Access Point without WEP turned on in their Client NIC (110) and the proper WEP parameters matching those in the Access Point turned on as well. This issue makes it impossible to support both people who desire security and those who do not at the same time.

The Institute of Electrical and Electronic Engineers (IEEE) has announced improvements to the security processes utilized in the 802.11 specifications. These improvements are known as Wireless Protected Access (WPA) and WPA2. Both improvements provider a greater degree of security over WEP, but still do not permit both secure and non-secure Clients to connect to the same Access Point. WPA2, in particular, requires new Access Point hardware and new Client NIC cards to be purchased by users who desire to use the improved WPA2 security. While a WPA2 Access Point will support WEP clients, it cannot support both WPA2 and WEP-based clients at the same time.

There are three typical types of authentication that are available for use with 802.11b networks: Open system; Shared Key; and IEEE 802.1X.

Open system authentication authenticates all wireless nodes using the Client NIC MAC Address (105), its wireless adapter hardware address. A hardware address is an address assigned to the network adapter during its manufacture and is used to identify the source and destination address of wireless frames.

For infrastructure mode, although some wireless APs allow you to configure a list of allowed hardware addresses for open system authentication, it is a fairly simple matter for a malicious user to capture frames sent on your wireless network to determine the hardware address of allowed wireless nodes and then use that hardware address to perform open system authentication and join your wireless network.

For ad hoc mode, there is no equivalent to configuring the list of allowed hardware addresses in Windows XP. Therefore, any hardware address can be used to perform open system authentication and join your ad hoc mode-based wireless network.

Shared key authentication verifies that the wireless client joining the wireless network has knowledge of a secret key. During the authentication process, the wireless client proves it has knowledge of the secret key without actually sending the secret key. For infrastructure mode, all the wireless clients and the wireless AP use the same shared key. For ad hoc mode, all the wireless clients of the ad hoc wireless network use the same shared key.

The IEEE 802.1X standard enforces authentication of a network node before it can begin to exchange data with the network. Exchanging frames with the network is denied if the authentication process fails. Although this standard was designed for wired Ethernet networks, it has been adapted for use by 802.11b. IEEE 802.1X uses the Extensible Authentication Protocol (EAP) and specific authentication methods known as EAP types to authenticate the network node.

IEEE 802.1X provides much stronger authentication than open system or shared key and the recommended solution for Windows XP wireless authentication is the use of EAP-Transport Level Security (TLS) and digital certificates for authentication. To use EAP-TLS authentication for wireless connections, you must create an authentication infrastructure comprising of an Active Directory domain, Remote Authentication Dial-In User Service (RADIUS) servers, and certification authorities (CAs) to issue certificates to your RADIUS servers and wireless clients. This authentication infrastructure is appropriate for large businesses and enterprise organizations, but is not practical for the home or small business office.

A solution to the use of IEEE 802.1X and EAP-TLS for the medium and small business is being developed. Windows XP Service Pack 1 and the Windows .NET Server 2003 family will both support Protected EAP (PEAP) and the Microsoft Challenge-Handshake Authentication Protocol, version 2 (MS-CHAP v2) EAP type. With PEAP and MS-CHAP v2, secure wireless access can be achieved by installing a purchased certificate on a RADIUS server and using name and password credentials for authentication.

Hot Spots typically provide no wireless link security. This is due to the fact that there is no mechanism for managing "keys" for transient users. The existing technology is vulnerable to hackers and the newer technology will not allow AES encryption to be run in the same Access Point as WEP-enabled customers. Hot Spots are faced with a situation wherein they cannot deploy the newer security technology as it means they will lose existing customers unless their customers also upgrade to the newer technology.

"Koolspan" functionality provides for mutual authentication of both the Client and the Network Edge device, typically an Access Point based on secure, tamper-resistant tokens on both sides of the wireless link. The modifier "Koolspan" refers to the authentication and secure communication technique(s) disclosed in U.S. patent application Ser. Nos. 10/679,371; 10/679,268; and 10/679,472, the disclosures of which are incorporated by reference in their entirety. As a product of this authentication process, a "Session Key" is independently generated on both sides of the link that is used to secure communications across the link for the duration of the session. Typically, the Access Point software is modified to provide for Koolspan authentication and to read an attached Koolspan token. Since this functionality requires modification of the Access Point software and an available port into which the token can be attached, not every Access Point can directly support Koolspan functionality. Existing wireless networks implement WEP security, the original security standard for 802.11 networks. This security mechanism is not safe and can be easily cracked. Newer technologies such as WPA and WPA2 are more secure, but will require new Access Points to be deployed and or new Network Interface Cards (NIC) for the user to install. It is highly desirable, therefore, that a means be provided that would allow the network to achieve Koolspan functionality without requiring the Access Points to be modified or replaced.

SUMMARY OF THE INVENTION

The present invention provides an external in-line device ("Subnet Box") placed between the network and the access point to achieve Koolspan functionality without modifying the Access Point. Much like a dual-Ethernet ported firewall, the Subnet Box contains an embedded Koolspan token and will authenticate users based on pre-stored access rights.

In an embodiment of the invention, a method of facilitating authentication and security at an edge of a network is disclosed comprising the steps of: receiving a data packet; determining whether a source identifier exists in said data packet; and if the source identifier exists, retrieving a cryptographic key from local storage associated with the source identifier, and decrypting a portion of the data packet using the identified cryptographic key, and directing the data packet toward its recipient. The step of retrieving comprises the steps of: identifying a match to the source identifier, e.g., MAC address, within a pre-stored list of source identifiers; and loading a cryptographic key associated with a matching source identifier from the pre-stored list of source identifiers. If the source identifier doesn't exist, the method comprises identifying whether the data packet is a pass-through data packet, and then either directing the data packet toward its recipient if the data packet is identified as a pass-through data packet, or dropping the data packet if the data packet is not identified as a pass-through data packet.

In another embodiment of the invention, an apparatus is disclosed comprising: a first communications port for intercepting data packets communicated to and from a wired communications network; a second communications port for intercepting data packets communicated to and from a wireless access point, wherein the wireless access point is an edge device of the wired communications network; a database comprising a number of serial numbers each associated with a client token and a secret cryptographic key; and a processor for determining whether a computing device having a client token can access the wired communications network via the wireless access point. The processor establishes a secure tunnel between the computing device and the first communications port.

An advantage of the invention is that it provides an external solution that enables a totally secure tunnel across the wireless link, thereby allowing secure transmissions between the Subnet Box and the connected Client regardless of the intervening Access Point. Another advantage of the present invention is that it allows existing customers without a Koolspan token to "pass-through" the Subnet Box without security as before.

Another advantage of the invention is that it implement an authentication and wireless security technique at the edge of the network without requiring modification of the Access Point software/hardware. The invention works with all flavors of 802.11: "a", "b", "g" etc. and provides automatic security without needing to distribute keys across a wired or wireless network.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 1 illustrates a conventional Wi-Fi network;

FIG. 2 illustrates a Wi-Fi network implementing a Subnet Box according to an embodiment of the invention;

FIG. 3 illustrates Subnet Box functionality according to an embodiment of the invention;

FIG. 4 illustrates a conventional encapsulation protocol stack;

FIG. 5 illustrates packet types according to an embodiment of the invention;

FIG. 6 illustrates a client driver according to an embodiment of the invention;

FIG. 7 illustrates "Koolspan" client packets according to an embodiment of the invention;

FIGS. 8a-c illustrate processes implemented by the Subnet Box according to an embodiment of the invention;

FIG. 9 illustrates a process implemented by the Subnet Box according to an embodiment of the invention;

FIG. 10 illustrates an authentication process according to an embodiment of the invention; and FIG. 11 illustrates a Subnet Box according to an embodiment of the invention.

DETAILED DESCRIPTION OF THE PREFERRED EMBODIMENTS

Preferred embodiments of the present invention and their advantages may be understood by referring to FIGS. 2-3 and 5-11, wherein like reference numerals refer to like elements, and are described in the context of a Wi-Fi network. Nevertheless, the present invention is applicable to wired and wireless communication networks in general.

The objects of the present invention are as follows: first, to implement Koolspan functionality across the wireless link (User ←(AP)→ a Subnet Box) using any 802.11-compliant Access Point without modification and second, to provide a facility that provides wireless link encryption for Koolspan-enabled clients and at the same time allowing non-Koolspan clients to pass through to the network across the wireless link.

The Koolspan technique is an improved method of authentication and security that provides a secure Wi-Fi communications method and system employing a combination of physical keys, or tokens, that attach to existing computing devices and wireless access points. These keys are typically connected via a USB port, although other types of connections, e.g., Ethernet, PC-Card, serial, parallel, and the like may be employed. In overview, each component of the Wi-Fi network employs a physical key. For example, a client key is used to enable wireless connections on a user's computing device. An access point key ("AP key") is used to activate at the access point the secure Wi-Fi functions described herein. Moreover, a master key is provided to enable and administer secure authentication and communications on the network. Each key comprises a serial number, which is forever unique, and must be unlocked using a personal identification number (PIN) known only to the owner, i.e., user, of the key. This PIN can be changed by the owner at any time.

Each physical key comprises a common network send ("NKS") and a common network receive ("NKR") cryptographic key used only during the authentication phase by all components on the LAN. Each physical key further includes a unique secret cryptographic key used in the second step of the authentication process. There is no mathematical relationship between key serial numbers and either the network send or network receive cryptographic keys, and the unique secret cryptographic key. The authentication process results in two random numbers that are known by both sides of the wireless channel and are uniquely generated per communications session. For example, when a client connects to an access point, the authentication process results in two unique random numbers being generated (one on each side of the connection). Only the random numbers are sent across the wireless channel and in each case these numbers are encrypted.

A transposed cryptographic key is used to encrypt all communications across the wireless channel between client and access point on behalf of the user. The transposed cryptographic key is preferably a 32-byte (256-bit) key generated using the random numbers generated during authentication and the client's secret cryptographic key. Using the serial number of the client's physical key, the access point knows the client's secret cryptographic key. Thus, both sides of the wireless channel know the secret key without it ever being transmitted between the two. The two random numbers are used to scramble the secret cryptographic key to generate a transposed version, which is finally used by both sides for secure data transmission after authentication.

Referring to FIG. 2, the Koolspan authentication and security technique is implemented in an in-line device (160) called a "Subnet Box" that is inserted in between the Access Point (140) and the network (190). This technique does not require an authentication server, certificate server or any other network support.

In an exemplary embodiment of the invention, the Subnet Box comprises several hardware components as seen in FIG. 11. These components include an field programmable gate array (FPGA) (1200) (e.g., an Altera FPGA), a Smart Card (1210), (2) Ethernet transceiver integrated circuits (1240/1260), two Ethernet ports (1250/1270), flash memory (1220) and synchronous SRAM memory (1230) integrated circuits. Additional interface components are also added to the design. The Subnet Box can be powered over Ethernet (POE) according to standard, well-known techniques (1260) or powered by an external AC adaptor (1230).

As seen in FIG. 11, the block diagram of the Subnet Box, there are two Ethernet Ports. The wireless Access Point is connected to the first Ethernet Port (1270) and the Subnet Box is connected to the Network through the second Ethernet Port (1250). All packets sent from clients destined for the network must pass through the Subnet Box.

The FPGA (1200) acts as a control element of the Subnet Box. An Altera FPGA is a field-programmable gate array comprising approximately 6,000 logical elements. The internal configuration of the Altera Chip is programmed according to the desired hardware functionality. The Altera FPGA (1200) internal sub-sections are configured to include the NIOS 32-bit processor (1201), AES Crypto Engine (1203), a memory bus interface (1204), a Smart Card interface (1202) and a PCI-bus interface (1205).

The NIOS processor (1201) executes firmware instructions contained within the Flash Memory (1220) as interfaced through the Memory Bus Interface (1204). External data storage is provided in the Sync SRAM IC (1230). The NIOS processor (1201) reads the Smart Card data through the SIM I/F interface (1202) and processes Ethernet packets coming to/from the wireless Access Point through Ethernet Port (1270) via the Ethernet Transceiver IC (1260). The hardware interface to the Ethernet Transceiver IC (1260) is via the Altera FPGA (1200) PCI Interface (1205). Ethernet packets to/from the wired network are interfaced similarly via the Ethernet Transceiver IC (1240) and physical jack (1250).

While an Altera FPGA IC (1200) has been implemented in the preferred embodiment, an entirely different hardware configuration may be utilized to the same effect.

Subnet Box Functionality

As seen in FIG. 2, all packets to/from the Client's PC (120) via the Client NIC (110) must go through the Subnet Box (160) before reaching the wired Ethernet network (190). The Access Point (140) is configured without WEP security and is left in "open" mode; that is, any 802.11 Client NIC (110) can authenticate and associate to the Access Point (140). All Client PCs (120) will be authenticated and bridged onto the Ethernet cable (150). Any Ethernet packet that is sent from the Client NIC will be 'bridged' onto the Ethernet cable (150) attached to the Access Point (140). The function of the Subnet Box is to permit Koolspan Client NICs (110) to establish a secure "tunnel" between the Client's PC (120) and the Subnet Box (160) providing security across the wireless 802.11 network. All traffic to/from the Client's PC (120) is encrypted using secure keys.

In the preferred embodiment, the secure keys are stored in a secure, tamper-resistant Smart Card (128) inside a Koolspan Token (125). The token is attached to the Client PC via one of many interfaces (USB port, Parallel port, Serial Port etc.) The secure keys are never exchanged or transmitted and are thus impervious to sniffing across the wireless network.

As seen in FIG. 3, the Subnet Box comprises two Ethernet ports. The first Ethernet port (305) is attached to the Ethernet cable (150) that is connected to the Access Point (140) in FIG. 2. The Ethernet port is identified by its MAC Address (300), a 48-bit hardware address whose function is well understood by one of ordinary skill in the art. Similarly, a second Ethernet port (315) is found on the Subnet Box that is attached to the Wired Ethernet Network (LAN, 190) in FIG. 2. Packets input on the Ethernet port (305) must be processed internally within the Subnet Box (160) before appearing on port (315) and then going onto the network (190).

The Subnet Box further contains a KEY DATABASE (340) that is uploaded securely by a Key Management Program. The KEY DATABASE contains, by example, all of the SERIAL NUMBERS of authorized Client Tokens (125) and their encrypted Secret Key (NK_UIDs). Additional parameters may be stored in the Key Database (340) such as STATUS, PRIORITY etc.

The Subnet Box further maintains a table (330) containing a list of all active Client sessions. Entries in this table are made from time to time as individual Clients are authenticated in the Subnet Box. This table (330) contains the Client NIC's MAC Address(105), Client Token (125) Serial Number and AES Session Key among other parameters.

Koolspan Protocol

As seen in FIG. 7, Koolspan packets are formed by setting the TYPE field (530)="Koolspan" within the Ethernet Header (150). The next eight bytes of the data portion of the Ethernet packet are used as the Koolspan Protocol Header (KP) as seen in FIG. 7. The Koolspan Protocol Header (720) contains various parameters (740) such as KOOLSPAN_TYPE. The setting of "KOOLSPAN_TYPE' defines how the rest of the Ethernet packet is constructed.

There are three currently defined KoolspanTypes.
Type=KEP AES Encrypted IP data;
Type=KMP Koolspan Management Protocol; and
Type=KAP Koolspan Authentication Protocol.

Client NDIS Intermediate Driver

In a preferred embodiment, as shown in FIG. 6, an NDIS Intermediate Driver (630) is placed in the driver stack of the operating system, e.g., Microsoft Windows Operating System. The purpose of this NDIS Intermediate Driver (630) is to intercept packets to/from the network at the appropriate level. In non-Koolspan mode, when the Client Key is NOT inserted, the NDIS Intermediate Driver (620) operates in pass-through mode (640) whereby all packet between the LAN Protocols component (660) and the NDIS Device Driver (620) are untouched.

When the Koolspan Key is first inserted, the NDIS Device Driver (620) for the wireless NIC (110) will perform an "open authentication" followed by an "association" with the Access Point as previously described. On completion of the "association", the NDIS Device Driver (620) will trigger an event message that is passed up the stack to signify that association is complete and the Client's PC is now on the network. As the Koolspan Client Key has been inserted, the NDIS Intermediate Driver (630) is now intercepting all packets between the LAN Protocols (660) and the NDIS Device Driver (620). The NDIS Intermediate Driver (630) will now attempt to perform a Koolspan Authentication wherein a Koolspan Authentication Packet is formed by the NDIS Intermediate Driver (630). As the Access Point (140) is acting now in bridge mode, all packets received are simply passed onto the Ethernet Cable (150) where they are received first by the Subnet Box (160).

As seen in FIG. 5, all Ethernet packets comprise a DESTINATION_MAC_ADDRESS (SIO), a SOURCE_MAC_ADDRESS (520) and a TYPE field (530) that precede the data portion of the packet (540). The MAC addresses are 48-bit fields that identify a unique hardware address of a node on the network. The TYPE field is used to determine how to process the data portion (540). Well known packet types are as follows:

TABLE 1

Ethernet Packet Types

| FIG. 5 | Name | Type | Description |
|---|---|---|---|
| 550 | ARP | 0806 | Address Resolution Protocol |
| 560 | RARP | 8035 | Reverse Address Resolution Protocol |
| 570 | IP | 0800 | Normal IP Traffic |
| 580 | Koolspan | "koolspan"[1] | Koolspan Packet |

[1]Koolspan Type to be subsequently provided by the Internet Authority Naming Association (IANA).

Koolspan uses a well-defined fourth type (type="Koolspan") to distinguish Koolspan packets from other well-known packets (550/560/570). In forming a Koolspan first authentication packet, the Ethernet Header Type (530) is set to Koolspan and the DESTINATION_MAC_AD-DRESS (510) is set to "FF:FF:FF:FF:FF:FF". This initial setting will ensure that the Access Point "broadcasts" this first authentication packet to all locally connected nodes attached to the Access Point. The Subnet Box will be the only device locally attached to the Access Point that will respond to a Koolspan First Authentication Packet and will respond as shown in the flow chart, FIG. 8. When responding to the authenticating Client NIC (110), the Subnet Box will set its SOURCE_MAC_ADDRESS to that of its Access Point Ethernet Port (300) (hardware address)

The Subnet Box software is designed to intercept all packets of the Ethernet Type="Kookspan" including "Authentication Packets". There are several other types of Koolspan packets including "Management" and "Discovery" packets as well as "Koolspan Encryption" packets (the most common packet type for sending AES encrypted data during a session).

Subnet Box Packet Processing: Wireless Side Processing

Note the Subnet Box has two Ethernet Ports, one attached to the Access Point (300) and one attached to the LAN (wired network) side (310) as seen in FIG. 3. The Subnet Box further has an embedded Smart Card (165) that is provisioned with three keys:

NKS—Network Send Key
NKR—Network Receive Key
NK_UIDs—Secret Key

The NKS key is the mirror of the Client's NKR key and the NKR key is the mirror of the Client's NKS key. In this manner, data encrypted by the Client with his "SEND" key (NKS) can be decrypted with the Subnet Box's RECEIVE key (NKR).

In the preferred embodiment of the invention, the Subnet Box processes packets of data according to the series of flowcharts seen first in FIG. 8a.

On receipt of any wireless packet step 800, the Subnet Box will know from the Ethernet Header (150), the SOURCE_MAC_ADDRESS (520) of the Client NIC (110). This address will be saved temporarily. The Ethernet Header (150) will be examined further to determine the packet TYPE (530) in step 810. If the packet type is non-Koolspan (ARP (S O), RARP (560) or IP (570)), the Subnet Box will check its current configuration to see if unencrypted packets are allowed to pass through, step 812. If not, the packet will be dropped step 814. If "pass-through" is permitted, the packet will be sent, step 816, to the LAN via the LAN-PORT (165) of the Subnet Box.

If the Ethernet Header TYPE field (530) is set to Koolspan, the Subnet Box (165) will examine the next eight bytes as a Koolspan Protocol Header (KP) (720). Within the KP header, is a "KOOLSPAN_TYPE' field that can have one of several values: 1. Authentication; 2. Management; and 3. Encryption.

The KOOLSPAN_TYPE field is discovered in step 825.

Koolspan Authentication Protocol

If the KOOLSPAN-TYPE is "Authentication", the Subnet Box (165) will examine the data portion of the Ethernet packet (730) as an "authentication packet" (700). The First Authentication Packet is generated by the Client NDIS Intermediate Driver (630) and is formed as shown in FIG. 7. After the Ethernet Header (150), the data portion of the Ethernet packet comprises a Koolspan Protocol Header (720) whose internal structure is shown in the diagram (740). The Koolspan Protocol Header (KP) (720) is followed by a Koolspan Authentication Packet Header (KAP) (710)

The KAP (710) includes several fields shown by example (700) including the authentication version, KOOLSPAN_TYPE etc. The Subnet Box (160) will process the data portion of the packet that contains the appropriate encrypted Koolspan authentication data formed by the Client NDIS Intermediate Driver (630).

The Subnet Box will begin processing the First Authentication Packet step 827, by decrypting the authData (shown in 700) with the Subnet Box's NKR (Receive Key), step 860, contained within the Subnet Box Smart Card. The structure of an Authentication Packet is shown by example in step 855. Various checks are made to determine if the packet has been altered. In step 865, the Serial Number of the Client's token (125) is used to retrieve the Client's Secret Key (NK_UIDs) from the Subnet Box Database (340) of previously stored Serial Numbers and matching encrypted. Secret Keys (NK_UIDs). If the serial number does not exist in the Subnet Box Database (340) an error message, step xxx, is returned to the Client. If the serial number is found in the Subnet Box Database (340), then the Client's NK-UISs is retrieved from the Subnet Box Database (340) and the hash is computed on the received data, step 868, and compared, step 869, against the received signature, step 862. If the signatures do not match, an error message is returned to the Client, step 870 and further processing stops.

If the signature match, a new entry is made in the Subnet Box Client Table (330), step 880, The entry into this table (330) contains the Client MAC Address (105) recovered from the Ethernet Header (520), the Client Token (125) Serial Number and eventually the AES Session Key when computed in step 890.

The Subnet Box will continue processing the AuthData recovering the Random Number (R1) by decrypting the internal packet data with the Client's NK_UID recovered from the Subnet Box Database (340) using the Client Key (125) Serial Number step 882. A second random number (R2) is computed, step 884, and concatenated with R1 and then encrypted with the Client's secret key (NK_UIDs), step 886. The ciphertext is then encrypted this time with the Subnet Box's SEND Key (NKS) and the ciphertext is placed into the "authData" field of the Koolspan Authentication Packet (700) and the appropriate parameters are set in the Koolspan Authentication Header to indicate this is the Second Authentication Packet and the entire packet is returned to the Access Point for transmission to the Client via the Client's MAC Address, step 892.

The Access Point, now acting as a bridge, delivers the Koolspan Second Authentication Packet to the Client, step 1105. The construction of the packet data is shown, by example, in step 1100, FIG. 10. Referring to FIG. 10, The authData of the Authentication Packet (700) is decrypted by the NDIS Intermediate Driver (630) step 1110 yielding the encrypted RI:R2 numbers and the signature. The encrypted R1:R2 numbers are then decrypted with the Client Token's (125) RECEIVE KEY (NKR), step 1130, yielding the unencrypted R1:R2 combination. A signature is computed from these two numbers, step 1140, and compared against the received signature, step 1150. If a match is not found, the error is reported to the user, step 1160, and processing terminates leaving the client blocked from sending further packets through the Subnet Box.

If a match is found, then the NDIS Intermediate Driver will conclude that the Koolspan Authentication process has been successful and will compute the AES Session Key from the two random numbers R1, R2, step 1180 and save the AES Session Key for further use during the session. All further communications between the Client and the Subnet Box will subsequently be encrypted with the AES Session Key. Additionally, the Client NDIS Intermediate Driver (630) will note the SOURCE MAC ADDRESS (520) of the Subnet Box that is returned in the Ethernet Header (150) of the Second Koolspan Authentication Packet. All further Koolspan-enabled communications between the Client NDIS Intermediate Driver will be specifically addressed to the MAC Address of Subnet Box Access Point port (300).

Encryption

If, in fact, the Client has been authenticated, then when sending network traffic of any kind, the Client NDIS Intermediate Driver (630) will encapsulate all of the fields of a normal Ethernet packet (IP header, TCP header, Application Data, Ethernet trailer with the exception of the Ethernet Header) as shown in FIG. 4, encrypting this data with the Client's AES Session Key. The Koolspan Protocol Header will set the KOOLSPAN_TYPE to Koolspan Encrypted Protocol (KEP) and the Ethernet Header Type will be set to Type="Koolspan".

On receipt of a type KEP Koolspan packet, processing will he directed to step 828 as shown in FIG. 8c. The Ethernet Packet Header will reveal the SOURCE MAC ADDRESS of the Client (105). The SOURCE MAC ADDRESS will (520) will be used to see if there is an entry in the Subnet Box NETWORK TABLE (330). If there is no entry for that SOURCE MAC ADDRESS (520), step 900, an error message will be returned to the Client NIC (110), step 910, and the packet will be dropped, step 912. If the SOURCE MAC ADDRESS (520) is found in the Network Table (330), it will then be used to retrieve the AES Session Key from the Network Table (330). The AES Session Key is then used to decrypt the Koolspan Data field resulting in a normal Ethernet Data Packet (non-Koolspan type). This packet is then directed appropriately to either the normal LAN port (310) or the Access Point port if the routing indicates the recipient also resides on the wireless side of the Subnet Box.

In the case of an inbound packet destined to be returned to another Koolspan-enabled Client on the wireless side of the Subnet Box, the plain-text packet, step 906, must now be encrypted with the recipient's AES Session Key for transmission to the recipient. If the recipient is not Koolspan-enabled and "pass-through" mode is enabled, the packet is simply sent normally without encryption. If "pass-through" mode is not enabled, the packet is dropped.

Routing

All AES-encrypted Koolspan packets are directed to the Subnet Box (165) using the Subnet Box's MAC address (300). This is necessary to ensure that all packets regardless of their destination be first decrypted in the Subnet Box before they are sent to their destination.

The reason this is necessary is that if two clients attempt to communicate on the same wireless side of the Access Point, the Access Point will simply route the received communications from the sending client to the receiving client as the Access Point routing table will not forward the packets to the Ethernet Port of the Access Point but instead retransmit the packet wirelessly. By forcing all packets to go directly to the Subnet Box regardless of their ultimate destination, this ensures that proper authentication and security are always maintained.

Dual-Use

The Subnet Box (160) can be configured to allow both non Koolspan-enabled Clients to communicate as well as Koolspan-enabled Clients. This method of allowing non Koolspan-enabled Clients to communicate is known as "pass through" mode.

In "pass through" mode, the Ethernet Packet Header Type field (530) indicates a non-Koolspan TYPE. On determination that "pass through" mode is enabled, the packet is allowed to pass through. It's final destination, however, determines how the packet is transmitted in the outbound direction.

If the packet was received on the Access Point side of the Subnet Box, Ethernet Port (300), and the destination is on the LAN side (310), the packet will simply be let through the Subnet Box (165) without further processing. If however, the destination is on the same Access Point side (300) i.e., another wireless Client connected to the same Access Point, further processing is required. If the destination Client is non-Koolspan enabled and "pass through" mode is enabled, the Subnet Box will simply pass the packet through to the Access Point via the Access Point Ethernet Port (300). If the destination Client is Koolspan-enabled, the packet must be encrypted using the destination Client's AES Session Key with an appropriate Koolspan KEP header and Koolspan KP header pre-pended to the packet.

This dual-use mode allows the possibility of both Koolspan-enabled Clients and non-Koolspan-enabled Clients to communicate on a wireless network. Koolspan-enabled Clients are provided automatic AES security across the wireless link whereas non-Koolspan-enabled Clients may be either denied access entirely (pass-through mode disabled) or provided non-secure access (pass-through mode enabled).

The technology described herein provides an end-to-end security link. In the preferred embodiment, the network is wireless, but in other embodiments the end-to-end link (client-to-subnet box) might not involve any wireless components.

The present invention provides a technique for automatically detecting both non-Koolspan clients and Koolspan-enabled clients and thus providing both protected communications for Koolspan-enabled clients and normal (non secure) communications for non Koolspan-enabled users simultaneously. Wireless link security can be provided in a public hotspot by the simple addition of an inline Koolspan Subnet Box providing automatic wireless link security without affecting existing non-Koolspan-enabled users.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

I claim:

1. A method of facilitating authentication and security at an edge of a network, the method permitting both secure and non-secure clients to simultaneously connect to the same access point, the method not requiring physical modification of the access point, the method comprising the steps of:

interposing an apparatus between a network and the network access point, the network access point not requiring modification, whereby all secure network traffic between a client and the network passes through the apparatus;

receiving, at the apparatus and from the client, a first random number encrypted using a cryptographic key associated with a token operably coupled to the client;

decrypting, at the apparatus and using a cryptographic key retrieved from a resource internal to the apparatus, the first random number;

sending, from the apparatus and to the client, a second random number encrypted using a cryptographic key associated with the apparatus;

generating, at the apparatus, a session key from at least the first random number and the second random number;

storing, at the apparatus, the session key in association with a source identifier;

receiving a data packet at the apparatus;

determining, at the apparatus, whether a source identifier exists in the data packet; and if the source identifier exists, retrieving the session key from the local storage using the source identifier, decrypting a portion of the data packet using the session key, and directing the data packet toward its recipient;

wherein the generating, at the apparatus, the session key from at least the first random number and the second random number comprises computing a session key from the cryptographic key associated with the token operably coupled to the client using the first random number and the second random number, wherein one of the first random number and the second random number is used to select a first bit of the session key from the cryptographic key associated with the token operably coupled to the client, and wherein the other of the first random number and the second random number is used to select subsequent bits of the session key from the cryptographic key associated with the token operably coupled to the client.

2. The method of claim 1, wherein the step of retrieving comprises the steps of:

identifying a match to the source identifier within a stored list of source identifiers; and loading a cryptographic key associated with a matching source identifier from the pre-stored list of source identifiers.

3. The method of claim 1, wherein the source identifier is a MAC address.

4. The method of claim 1, further comprising the steps of:

the source identifier does not exist, identifying whether the data packet is a pass-through data packet, and then either directing the data packet toward its recipient if the data packet is identified as a pass-through data packet, or dropping the data packet if the data packet is not identified as a pass-through data packet.

5. The method of claim 1, wherein the local storage comprises a token.

6. An apparatus for facilitating authentication and security at an edge of a network, the apparatus permitting both secure and non-secure clients to simultaneously connect to the same wireless access point without requiring physical modification of the access point, the apparatus comprising:

a first communications port for intercepting data packets communicated to and from a wired communications network;

a second communications port for intercepting data packets communicated to and from the wireless access point, wherein the wireless access point is an edge device of the wired communications network, the wireless access point not requiring modification;

a database comprising a plurality of serial numbers each associated with a client token and a secret cryptographic key; and computer logic configured to:

retrieve, in response to the apparatus receiving at the second communications port a first packet from a client, a cryptographic key associated with a serial number of a client token operably coupled to the client;

decrypt a first random number received from the client using the cryptographic key associated with the serial number of the client token operably coupled to the client;

encrypt a second random number using a cryptographic key associated with the apparatus, whereby an encrypted second random number is generated;

direct the apparatus to send the encrypted second random number to the client;

generate a session key from at least the first random number and the second random number;

store the session key in association with the serial number of the client token operably coupled to the client;

retrieve the session key in response to receiving a second packet containing an identifier, wherein the session key is retrieved using the identifier;

decrypt at least a portion of the second packet using the session key; and direct the second data packet toward its recipient;

wherein the generating, at the apparatus, the session key from at least the first random number and the second random number comprises computing a session key from the cryptographic key associated with the token operably coupled to the client using the first random number and the second random number, wherein one of the first random number and the second random number is used to select a first bit of the session key from the cryptographic key associated with the token operably coupled to the client, and wherein the other of the first random number and the second random number is used to select subsequent bits of the session key from the cryptographic key associated with the token operably coupled to the client.

7. The apparatus of claim 6, wherein the first and second communication ports are Ethernet ports.

8. The apparatus of claim 6, wherein the database is stored in a smart card.

9. The apparatus of claim 6, wherein the wireless access point is an IEEE 802.11 access point.

10. The apparatus of claim 6, wherein the wired network is a LAN.

11. The method of claim 1, further comprising:

determining that the data packet is a pass-through data packet; and directing the data packet toward its recipient.

12. The method of claim 1 wherein the first random number encrypted using a cryptographic key associated with the token operably coupled to the client is contained in a packet configured to be broadcast to a plurality of nodes.

13. The method of claim 1 wherein the receiving comprises receiving at the apparatus and from the client, a first random number encrypted using a cryptographic key associated with a token operably coupled to the client, wherein the first random number encrypted using a cryptographic key associated with a token operably coupled to the client is further encrypted using a cryptographic key associated with the apparatus.

14. The apparatus of claim 6 wherein the first random number is received in a packet configured to be broadcast to a plurality of nodes.

15. The apparatus of claim 6 wherein the first random number received from the client is encrypted using the cryptographic key associated with the serial number of the client token operably coupled to the client and is further encrypted using a cryptographic key associated with the apparatus.

16. The method of claim 1, further comprising:
 determining if the data packet includes a non-standard header type.

17. The method of claim 16, wherein the non-standard header type is a Koolspan header type.

\* \* \* \* \*